United States Patent Office 3,375,719
Patented Apr. 2, 1968

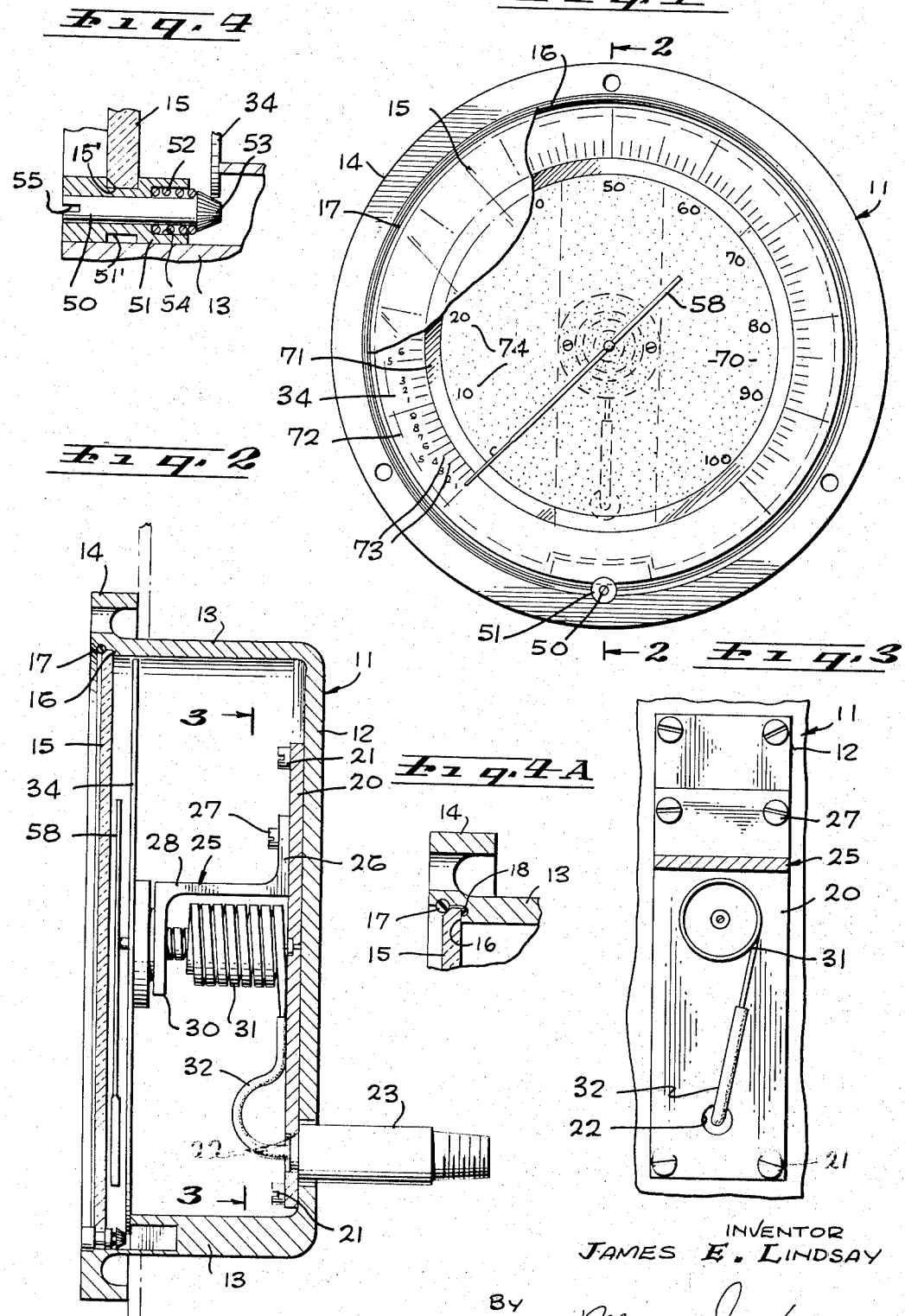

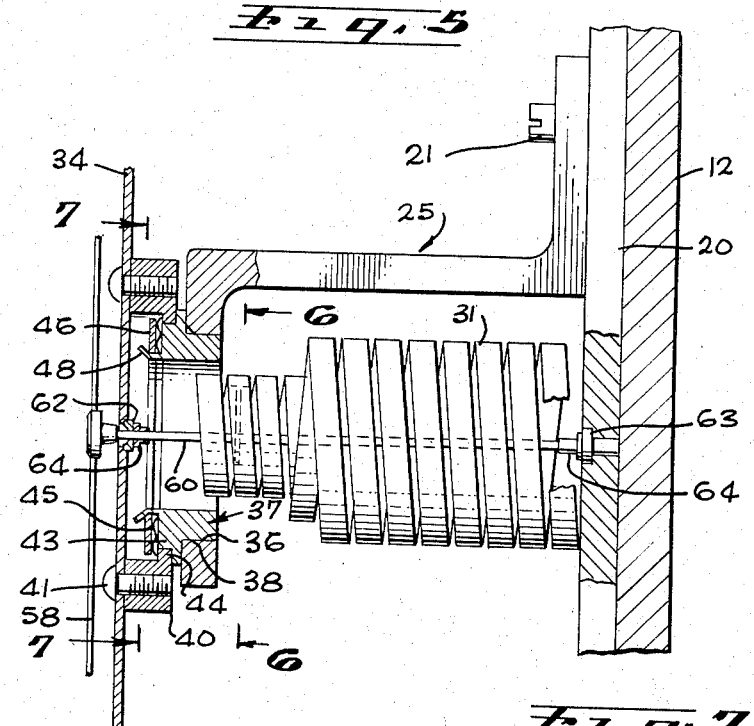
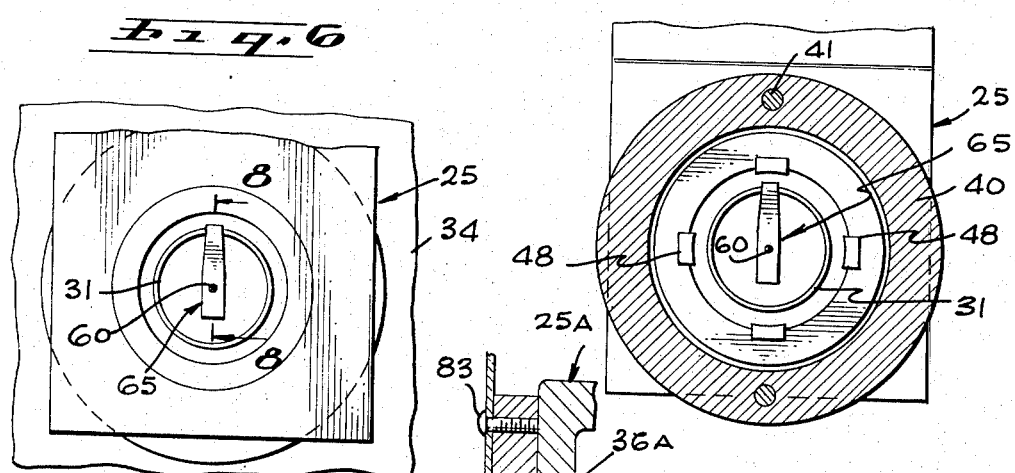
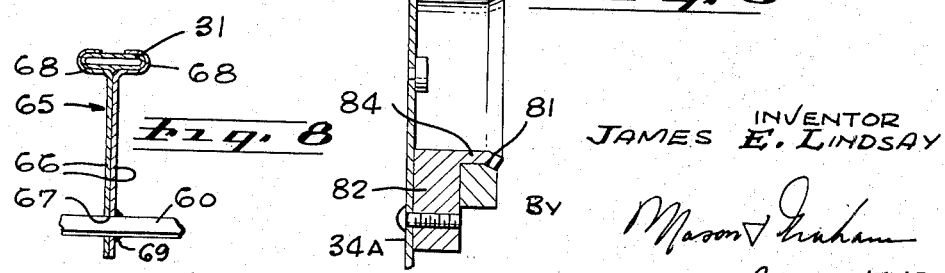

3,375,719
PRESSURE GAUGE
James E. Lindsay, 2583 Buenos Aires Drive,
Covina, Calif. 91722
Filed Mar. 4, 1966, Ser. No. 531,728
9 Claims. (Cl. 73—411)

ABSTRACT OF THE DISCLOSURE

A pressure gauge including a multilayer helical Bourdon tube with the axis of the helix normal to the dial plate and pointer shaft, with the pointer shaft journaled in the dial plate. A tube engaging member mounted on the shaft and movable along the tube for driving the shaft and for calibration of the gauge. A rotatable dial plate and a rotatable drive shaft engaging the periphery of the plate for angular setting of the dial position.

---

This invention has to do with pressure gauges and particularly with such gauges as utilize a Bourdon tube as the pressure sensing and responsive means.

An object of the invention is to provide a pressure gauge utilizing a Bourdon tube and embodying a new and improved mounting for the tube.

Another object of the invention is to provide, in a pressure gauge or the like, novel means for mounting a dial in a case whereby the same may be rotated for adjustment. In this connection it is an object to provide novel means for rotatively adjusting the dial relative to the case in which it is mounted and relative to an indicator means.

A further object is to provide a novel mounting for a Bourdon tube pressure gauge element, and a dial and pointer assembly. In this connection it is an object to provide novel means for supporting and journaling a pointer shaft.

Still another object is to provide novel means for operatively connecting a pointer or indicator element with the free end portion of a Bourdon tube.

It is also an object to provide a novel dial designed to enable the accurate reading thereof when used in conjunction with a pointer.

These and other objects will be apparent from the drawings and the following description. Referring to the drawings:

FIG. 1 is a face view, partially broken away, of a gauge embodying the invention;

FIG. 2 is a cross sectional view on line 2—2 of FIG. 1;

FIG. 3 is a fragmentary sectional view on line 3—3 of FIG. 2;

FIG. 4 is an enlarged fragmentary sectional detail view of the dial drive pin assembly shown in the lower left corner of FIG. 2, the section being in the same plane as FIG. 2;

FIG. 4A is a view similar to FIG. 4, but of the upper left portion of FIG. 2;

FIG. 5 is an enlarged fragmentary sectional view in the same plane as FIG. 2 of the dial mounting bracket and assembly with portions of the device broken away;

FIG. 6 is a fragmentary sectional view on line 6—6 of FIG. 5;

FIG. 7 is a fragmentary sectional view on line 7—7 of FIG. 5;

FIG. 8 is a fragmentary detail sectional view of the clip on line 8—8 of FIG. 6, but on a larger scale; and FIG. 9 is a view similar to the left-hand portion of FIG. 5, but showing an alternate construction.

More particularly describing the invention, numeral 11 generally designates a case having a main or base wall 12 and a substantially circular side wall 13. The latter terminates in a peripheral mounting flange 14 although the mounting flange may be at the rear or intermediate the front and rear of the case. The case is closed in front by a transparent crystal 15 of glass or plastic which seats against a shoulder 16 and is held in place by a split ring 17. A dust seal 18 is provided in a groove in the face of the shoulder.

I mount a base plate 20 against the main wall 12 of the case as by means of screws 21. This plate is apertured at 22 and a fitting 23 is mounted therein. It will be understood, of course, that the fitting 23 can be mounted in the side wall 13 of the case where desired. It is contemplated that the fitting be connected to the pressure line monitored by the gauge. I provide a dial mounting bracket 25 which has a base or foot 26 secured to the base plate 20 by screws 27. The foot extends laterally of and normal to a central section 20 of the bracket. At the other end of the bracket I provide a mounting shelf 30 which is parallel to the foot but extends laterally to the opposite side of the central section.

Between the mounting shelf and the base plate I provide the Bourdon tube 31 which may have several layers of helically coiled tubing, the particular tube shown having three. The end of the tubing adjacent the base is connected by a capillary tube 32 to the fitting 23.

Bracket 25 is intended to support a dial or dial plate 34 for rotation relative to the bracket and the case. For this purpose the mounting shelf is apertured at 36 and fitted with a bushing 37 which projects axially beyond the mounting shelf, the bushing having a reduced section 38 within the shelf. The dial plate 34 is mounted on the bushing by means of a mounting ring 40 secured to the inner face of the dial plate by screws 41. The ring is provided with an inner flange which is received on the end portion 43 of the bushing beyond a flange 44 thereof. The mounting ring is retained by a waved washer 45 and a retainer ring 46 which in turn is held by outwardly bent fingers 48 on the bushing. With the construction thus far described, the dial plate may be rotated relative to the case against the friction imposed by the washer 45, to enable its adjustment as will later appear.

I provide means for rotatively adjusting the dial which includes an adjustment pin 50 in a bushing 51 which is mounted at one side of the casing in the wall 13. The bushing is held by a cutout 15′ in the crystal 15 which fits into a groove 51′ in the bushing. Pin 50 is urged inwardly of the casing against the periphery of the dial by a coil spring 52 which bears against a head 53 on the pin and is received in a counterbore 54 in the bushing. The latter is of frusto-conical shape, being knurled or otherwise roughened for frictional engagement with the periphery of the dial plate as best shown in FIG. 4. A slot 55 or a socket may be provided in the end of the pin to enable it to be turned by a suitable tool for the purpose of adjusting the dial.

The gauge has a pointer 58 on the outside of the dial which is detachably fixed on the end of a pointer shaft 60 by conventional means. The shaft is disposed on the axis of the Bourdon tube and is journaled in a bearing 62 in the dial plate and also journaled in a bearing 63 provided in the base plate 20. Adjacent each bearing the shaft is provided with a flanged bushing 64 to prevent axial play of the shaft.

One of the features of the invention is the provision of a special clip, designated 65, for connecting the shaft with the free end of the Bourdon tube. This clip comprises two identical thin strips of spring metal 66 which are spot-welded or otherwise joined in any suitable manner in superposed relation. The clip is apertured at 67 to receive the pointer shaft. At one end, each strip 66 is bent into a rounded hook section 68 facing the other, the two hook sections providing means for clamping the end of the clip about the desired region at the free end of the Bourdon tube. A suitable cement, such as an epoxy resin, or some other means may be used for securing the clip to the shaft and to the tube, although none is necessary for anchoring the clip to the tube due to the spring quality of the clip. It will be appreciated that the clip can be attached to any portion of the tube thereby facilitating the original calibration of the tube. In FIG. 8, numeral 69 represents the cement.

Another feature of the invention is the provision on the dial plate of a face which makes it easy for one to accurately read the position of the pointer. The dial plate 34 has a dial face with an inner circular field or area 70 which is preferably of a relatively dark dull color or shade. Surrounding this is a circular band 71 of limited width which has a mirror surface. Outwardly of this latter band is an arcuate area 72 which is white or of a very light tone upon which numbered gradation marks 73 appear, extending radially outwardly from the dial arc. Indicia 74 are shown provided in the area 70.

It should be noted that in the arrangement shown, the dial arc and gradation marks are radially outward of the mirror band 71 and that, in consequence, the pointed need only extend part way into the area 72, and not clear across the area as where the mirror band is located outwardly thereof in conventional arrangements. Thus the dial is extremely easy to read accurately since the pointer cannot cover and hide or partially cover and hide gradation marks thereon. The mirror band avoids incorrect readings due to parallax.

Although I have illustrated and described a preferred form of my invention, I contemplate that various changes and modifications can be made therein without departing from the invention, the scope of which is indicated by the following claims. By way of example, in FIG. 9 I show an alternate dial mounting. In this view, numeral 25A designates a dial mounting bracket such as the one previously described. This has an opening 36A, chamfered at 81, to receive a combined bushing and dial mounting ring 82 to which the dial plate 34A is secured by screws 83. The ring has an axially extending relatively thin-walled portion 84 which is swaged to be a friction fit in the bracket 25A. A suitable dry lubricant may be used between the parts. This provides a construction wherein the dial plate may be readily turned and yet will have a desired frictional resistance to turning.

I claim:
1. A pressure gauge, comprising a case having a main wall, a fitting mounted in the casing for connection to a pressure line, a bracket mounted on said main wall and providing a mounting shelf spaced therefrom, a dial plate mounted on said shelf, a helically wound Bourdon tube supported between the dial plate and said main wall of the case and having one end connected to said fitting, the axis of the tube being normal to the dial plate, a rotatable pointer shaft on the axis of said tube and extending through said shelf and said dial plate, a pointer on said shaft, and a motion transmitting element fixed to said pointer shaft and engaging said tube for turning said shaft in response to turning movement of said portion of said tube, with said element movable along said tube for calibration of the gauge.

2. The pressure gauge set forth in claim 1 in which said dial plate is mounted for rotation with respect to said bracket and means is provided for adjustably rotating the same, said means for rotating including a drive pin rotatably mounted in said case and accessible from the exterior of the case, said pin having a peripheral portion in friction engagement with an arcuate portion of the dial plate and exerting pressure against the dial plate at the point of engagement in a direction toward the interior of the case, and means carried by the case supporting said dial plate against said pressure.

3. The pressure gauge set forth in claim 1 in which said motion transmitting element comprises an elongated clip having an aperture at one end receiving the pointer shaft and having clamping fingers at its other end engaging a portion of one convolution of the Bourdon tube at the free end of the tube.

4. In a gauge, a case, a dial supported by said case for at least a limited degree of rotation, an indicator means associated with the dial, a sensing element mounted in the case and operably connected to said indicating means, said dial having an arcuate portion concentric with its axis of rotation, and a dial drive element rotatably mounted in said case adjacent the arcuate portion of the dial and having a peripheral portion in driving engagement with said arcuate portion of the dial whereby said dial can be turned in response to rotation of the dial drive element, said dial drive element comprising a drive pin rotatably mounted in said case and accessible from the exterior of the case, said pin having a peripheral portion in friction engagement with said arcuate portion of the dial plate and exerting pressure against the dial plate at the point of engagement in a direction toward the interior of the case, and means carried by the case supporting said dial plate against said pressure.

5. The gauge set forth in claim 4 in which said dial drive pin comprises a cylindrical body having a frusto-conical knurled head engaging the dial plate.

6. In a gauge including a case having a main wall, means for mounting a dial plate, comprising a bracket mounted in the case, said bracket having a mounting shelf provided with an opening therethrough, a bushing in said opening, a dial plate, and means supporting said dial plate on said bushing to permit relative rotation between the dial plate and the bracket, said means supporting the dial plate on the bushing including a mounting ring fixed to the plate and rotatable on the bushing.

7. The construction set forth in claim 6 in which said bushing projects axially beyond the mounting shelf, in which said mounting ring receives an end portion of the bushing, and in which a spring washer is positioned therebetween to frictionally resist rotation of the parts.

8. A pressure gauge as defined in claim 1 in which said motion transmitting element comprises a resilient strip fixed to said shaft and in pressure engagement with said tube.

9. A pressure gauge as defined in claim 8 in which said element includes opposed hook sections engaging and clamping said tube therebetween.

References Cited

UNITED STATES PATENTS

| | | | |
|---|---|---|---|
| 1,521,343 | 12/1924 | Townsend | 73—368.6 X |
| 1,691,135 | 11/1928 | Schlaich | 73—411 X |
| 1,902,998 | 3/1933 | Hans | 73—411 |
| 2,215,310 | 9/1940 | Zupanec | 350—113 |
| 2,489,073 | 11/1949 | Bauman | 73—386 |
| 2,532,974 | 12/1950 | Warner | 116—129 |
| 2,918,819 | 12/1959 | Freeman | 73—415 X |

LOUIS R. PRINCE, *Primary Examiner.*

DENIS E. CORR, *Assistant Examiner.*

UNITED STATES PATENT OFFICE
CERTIFICATE OF CORRECTION

Patent No. 3,375,719            April 2, 1968

James E. Lindsay

It is certified that error appears in the above identified patent and that said Letters Patent are hereby corrected as shown below:

Column 2, line 17, "20" should read -- 28 --.
Column 3, line 23, "pointed" should read -- pointer --.

Signed and sealed this 2nd day of September 1969.

(SEAL)
Attest:

Edward M. Fletcher, Jr.
Attesting Officer

WILLIAM E. SCHUYLER, JR.
Commissioner of Patents